United States Patent
Kubota

[11] 3,912,920
[45] Oct. 14, 1975

[54] POLARIZED LIGHT ILLUMINATION DEVICE

[76] Inventor: Josuke Kubota, Rm. C-405, Mandai-higashi Apt., 2-17, Dairyo-cho, Sumiyoshi-ku, Osaka, Japan

[22] Filed: Feb. 6, 1974

[21] Appl. No.: 439,857

[52] U.S. Cl. ................ 240/9.5; 240/41.4; 350/147
[51] Int. Cl.² .. F21V 9/14; G02B 5/30; G02B 27/28
[58] Field of Search ............ 240/9.5, 41.4; 350/147, 350/152

[56] References Cited
UNITED STATES PATENTS
2,270,535  1/1942  Loud et al. ........................... 240/9.5
2,748,659  6/1956  Geffcken et al. ..................... 240/9.5

FOREIGN PATENTS OR APPLICATIONS
935,663  1/1956  Germany ............................ 240/9.5
493,951  5/1954  Italy .................................... 240/9.5
859,067  5/1948  France ................................ 240/9.5
518,236  3/1955  Italy .................................... 240/9.5

*Primary Examiner*—Joseph F. Peters, Jr.
*Attorney, Agent, or Firm*—Toren, McGeady and Stanger

[57] ABSTRACT

Light from a light source in the headlight of vehicles is polarized by forming a parallel beam with a paraboloidal reflector behind the light source and disposing a transparent laminated plate in the path of the beam. The plate is composed of transparent sheets disposed at an angle equal to the polarization angle and a material (e.g. air) between the sheets with a refractive index different from the refractive index of the sheets. The interfaces of the sheets and material polarize the parallel light and the light is projected to the next transparent sheet. The edge surfaces of the sheets are angular relative to the planes of the sheets and form light penetration planes and emergence planes both extending along the length of the plate. The planes are substantially perpendicular to the optical axis of the parallel light.

5 Claims, 6 Drawing Figures

POLARIZED LIGHT ILLUMINATION DEVICE

This invention relates to a light polarizing apparatus, and particularly a device for polarizing light from the headlamps of an automobile.

Generally it is known that, during night driving, glare from oncoming vehicles poses a serious safety problem.

One method of preventing a driver from being dazzled by the headlamps of an oncoming vehicle is to polarize light from the headlamps in one direction and polarize the windshield in another. However, such means require the use of heat resistant materials in the headlamp polarizers. It also involves substantial loss of light. Light which has passed through two polarizers is reduced to one-quarter of its original intensity.

The present invention is based on the above-mentioned situation and the principal object is to provide a polarized light illumination device which can utilize more effectively light from the light source without absorbing light than in the method using the polarizing plate at the illuminating side in order to shield the driver of automobile coming from the opposite direction from direct light from headlights by looking through polarizing plate to prevent glare.

Another object of the invention is to provide a polarized light illumination device having superior durability, and permitting free selection of materials which are stable against light and heat.

A further object of the invention is to provide a polarized light illumination device which can be easily attached to the headlight of vehicles.

This invention utilizes for the forward illumination of vehicles the polarized light produced by parallel beam from the headlight, which is produced with an obliquely disposed transparent laminated plate and the driver of the vehicle coming in the opposite direction sees the light through the polarizing plate so that the direct light from the headlight is shielded and glare is prevented.

The basic principle of this invention is explained next.

It is a well-known physical phenomenon that polarized light is produced when light obliquely strikes the plane of a transparent substance such as glass plate. Particularly, Brewster's law of $$\tan \theta = m \quad (1)$$

where
$\theta$ : angle of polarization
$m$ : relative refractive index is well known, and the transmittancy of light having an oscillation direction horizontal to the incident plane becomes 100 percent, while the transmittancy of light whose oscillation direction is vertical to the same is reduced due to reflection of a portion of the light.

The present invention utilizes this principle for forward illumination of vehicles by laminating the reflection surfaces so that transmitted light or reflected light is composed of light components fully having the same oscillation plane.

The novel composition of the present invention and the aforementioned objects will become apparent from description of embodiments based on the accompanying drawings.

The device of the invention is described with reference to the drawings.

Figure 1:
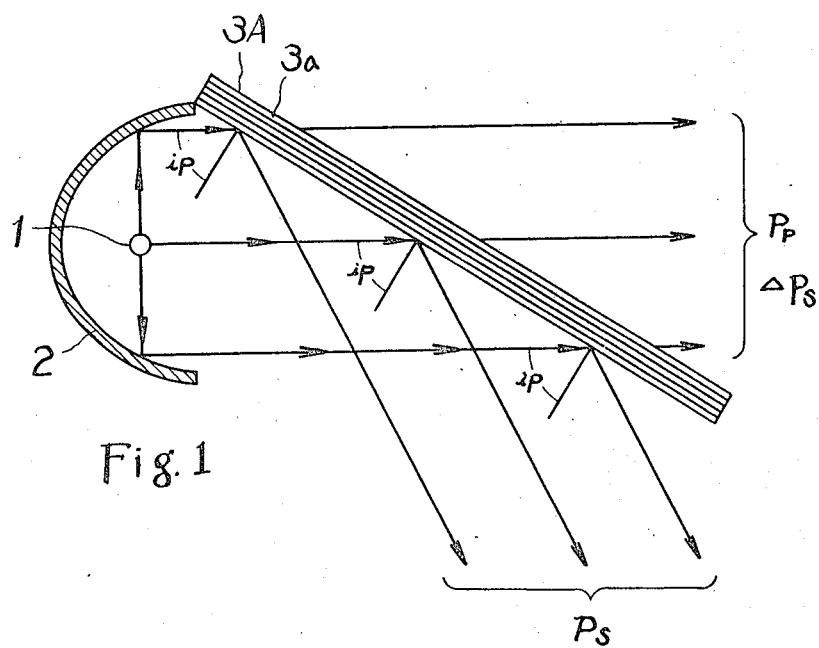
FIG. 1 is a schematic cross section of the device of this invention with the construction shown in its simplest form.

In FIG. 1, 1 is the light source of the headlight, 2 is a paraboloidal reflector and 3A is a laminated transparent plate which is an important requisite of the present invention.

This laminated transparent plate 3A comprises laminated transparent sheets $3a$ mainly made of glass and the like. Basically, it is necessary for the laminated transparent plate to be composed of two sheets. However in order to exhibit the action and the effect mentioned hereinafter, more than 10 sheets, preferably 25 sheets, are used in an actual practice.

A substance which has a different refractive index from that of each transparent sheet $3a$, for example, gas such as air or liquid such as transparent oil or the like, is filled between each transparent sheet $3a$ of the laminated plate 3A so that the laminated plate becomes a structure in which two phases having different refractive indices are stacked alternately in a plate form. It is possible to use transparent sheets $3a$ having different refractive indices but fabrication is more convenient using sheets with the same refractive index.

The laminated plate 3 formed in this manner is attached, at an angle to the front of the reflector 2 with known attachment means or to the front of the headlight of a vehicle. Light emitted from the light source is formed into parallel beam by the reflector 2 and projected at the angle of polarization ($ip$) on the laminated plate 3A.

In view of this construction, light from the light source 1 is directed forward as the parallel beam by means of the paraboloidal reflector 2 and strikes the laminated transparent plate 3A at an angle of polarization ($ip$). Thus only a light component ($Ps$) with the oscillation direction vertical to the incidence plane is reflected on each surface of the stacked transparent sheets while transmitted light therethrough has a mixture of a light component ($Pp$) with the oscillation direction parallel to the incidence plane and a light component, ($\Delta Ps$) a part of ($Ps$).

It is well-known that the law on reflection from the surface of a transparent substance is given by the Fresnel equation $$Rp = \frac{\tan^2 (i-r)}{\tan^2 (i+r)} \quad (2)$$

$$Rs = \frac{\sin^2(i-r)}{\sin^2(i+r)} \quad (3)$$

and the light reflection factor ($Rp$) whose oscillation component is parallel to the incidence plane and the light reflection factor ($Rs$) whose oscillation component is vertical to the incidence plane, can be obtained from the relation between the angle of incidence ($i$) and the angle of refraction ($r$). Also, the relation between ($i$) and ($r$), and the relative refractive index ($m$) is known as Snell's law, $$\frac{\sin i}{\sin r} = m \quad (4)$$

If glass with refractive index of 1.52 is selected as the transpatent sheet, the polarization angle becomes about 57° from Eq. (1) and consequently, the value of ($Rs$) becomes about 0.16 from Eq. (3). As the component ($Ps$) is actually about one half of the light from the light source, it means that 0.08 of the light from the light source is reflected.

Thus, it will not be possible to separate the light from the light source sufficiently into the component ($Pp$) and the component ($Ps$) with only one reflection. However if the laminated plate 3A is formed by stacking about 25 sheets as mentioned above, the reflection will be repeated at each interface of the transparent sheet 3a and the phase therebetween. This separates the light into two components ($Pp$) and ($Ps$) to satisfy the object of the invention.

In actual practice, however, the transmitted light comprising the light component ($Pp$) is utilized for the narrow angle forward illumination of the headlight while the light of component ($Ps$) illuminates the environs over a wide angle so that it does not directly illuminate the automobile coming from the opposite direction. Thus there is entirely no loss of the projected light from the headlight.

The above is a description of the simplest form of the construction based on FIG. 1 but in order to obtain polarized light required in this invention it is only necessary to project the parallel beam obliquely to the laminated plate so that an angle of polarization is produced with respect thereto. Therefore, the long laminated plate in FIG. 1 can be divided into sections and used in the pleat form as shown in FIG. 2 in order to avoid a long laminated plate from extending forward.

Figure 2:
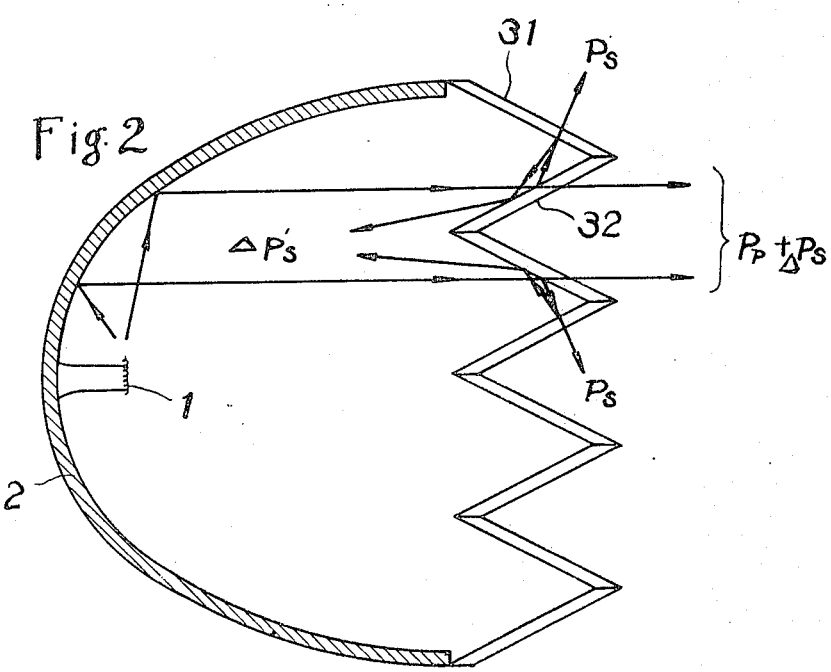
FIG. 2 is a schematic cross section of a second embodiment of the invention.

In explaining FIG. 2 in further detail, the laminated plate comprises a plurality of forwardly downwards slanting sections 31 thereof and forwardly upwards slanting sections 32. Wherein the light strikes these sections, the light component ($Ps$) striking the section 32 and reflecting therefrom strikes the section 31 adjacent to the section 32 so that the component ($Ps$) is allowed to pass mostly through the section 31 at a wide angle with respect to the projecting direction of the light component ($Pp$). Simultaneously, a portion ($\Delta P's$) of the light component ($Ps$) strikes the downwards slanting section 31 and is reflected therefrom to return the light source through a path with the reflection of the same on the opposite upwards slanting section 32 and again on the section 31 respectively. Similarly a portion ($\Delta Ps'$) reflected on the upwards section 32 returns the light source in an order corresponding to the above-mentioned as shown in FIG. 2. Thereafter the portion ($\Delta P's$) is projected forwards by the reflector 2.

Additionally, the arrangement of the divided sections slanting downwards and upwards alternately as shown in FIG. 2, may be changed so that they are slanted in the same direction similar to a Venetian blind.

The required conditions of the arrangement, as described above, of laminated plate by using laminated plates divided into sections for obtaining the polarized light necessary for this invention, will be summarized as follows:

1. In order to obtain the polarized light, the laminated plate should be arranged in such a manner that the parallel beam is projected at an angle of polarization on each section thereof.

2. In order to obtain the polarized light in the same direction from each section of the laminated plate, the incident plane with respect to each section should be mutually parallel when the parallel beam is projected on the laminated plate at an angle of polarization.

Next, another embodiment of the invention will be described with reference to FIG. 3 and FIG. 4 as follows.

The relation of $ip + r = \pi/2$ exists between the angle of polarization ($ip$) and the angle of refraction ($r$) when the light is projected at the former.

Figure 3:
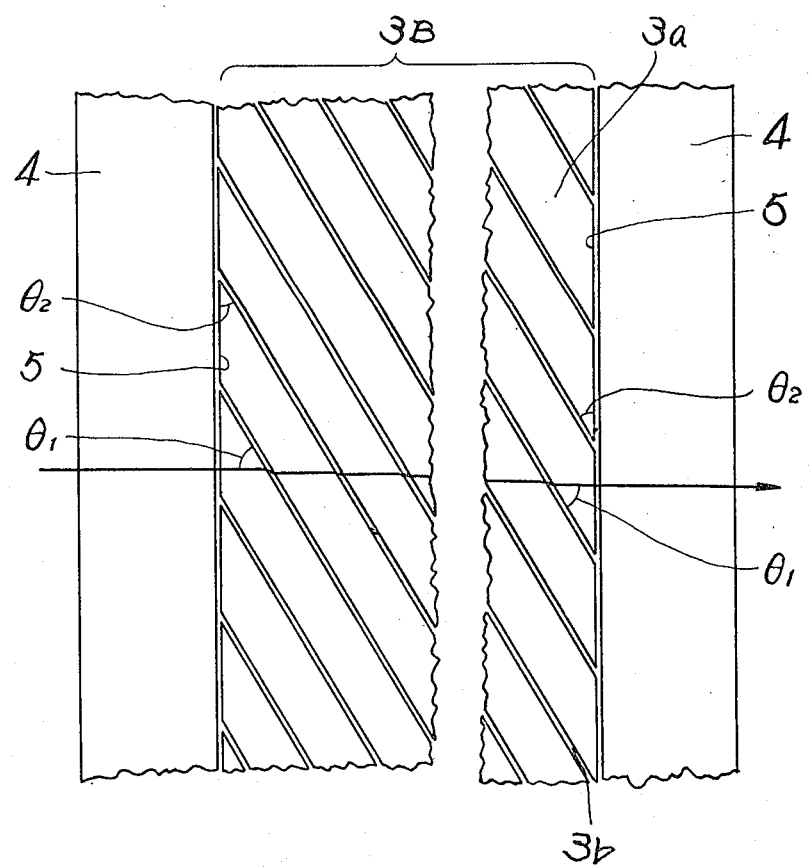
FIG. 3 is a partially enlarged cross section of a laminated transparent plate of another embodiment of the invention.

Accordingly, the laminated plate 3B is, as shown in FIG. 3, composed of transparent sheets 3a which are slanted respectively so that an angle $\theta_1$ between the slanting direction thereof and the optical axis of the parallel beam becomes equal to the angle of polarization ($ip$). The cross-section of the sheet is in the shape of a parallelogram having at the both ends thereof an acute angle $\theta_2$, with $\theta_2 = \pi/2 - ip$. Here the parallel beam projected perpendicularly onto the laminated plate 3B permits the light component ($Pp$) thereof to be picked out therefrom so as to be employed for the forward illumination of the headlight of vehicles.

According to one embodiment of the invention, the sheets 3a are glass and the material between them is air. The light through the abovementioned laminate plate passes through each transparent sheet and each phase therebetween, as shown in FIG. 3. The sheets 3a and phase 3b are alternately arranged to form the plate. When the light proceeds from sheet to air through the interface therebetween and vice versa, it encounters each interface at the polarization angle ($ip$). For example with the transparent sheet of glass and the air phase, the light passes through an interface 9 from the glass sheet towards the air phase and through the next interface 10 towards next glass sheet from the air phase at the polarization angle, as shown in FIG. 4, to separate the light into two light components ($Pp$) and ($Ps$).

Additionally, in FIG. 3 the reference numeral 4 denotes two transparent plates supporting the slantingly stacked transparent sheets at both ends thereof as illustrated.

Figure 4:
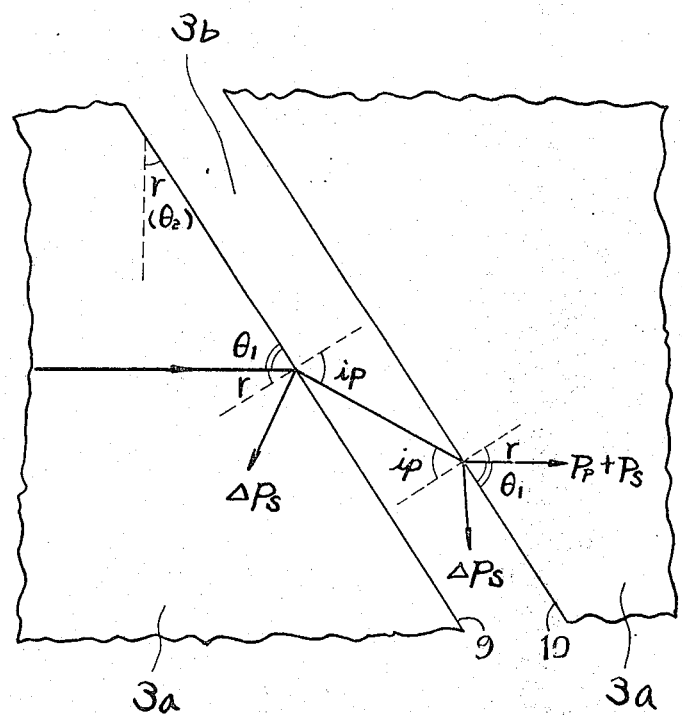
FIG. 4 is a partially enlarged cross section of laminated plate in FIG. 3, showing the light path therethrough.

To illustrate more fully, in FIG. 4 the light path is shown in an enlarged portion of the transparent sheet 3a and the phase 3b therebetween. This makes more evident the significance of the angle of the sheets on the laminated plate in FIG. 3. Incidentally, though FIG. 4 is considerably enlarged, in practice, even a minimum spaced interval between stacked glass sheets has the length sufficient to produce the light reflection thereon. Thus no particular device is required to dispose the glass sheets in spaced relation to each other. This is also true in the drawings other than FIG. 4.

When the laminated plate, comprising stacked transparent sheets having the end surface 5 at each end formed obliquely of the elongated direction of the sheet, the end surface 5 serves as the penetration plane of the parallel beam caused by the paraboloidal reflector so that the penetration plane can be aligned perpendicular to the parallel beam. This makes it possible to eliminate the deficiencies in construction where the laminated plate is made oblique and forwardly extended from the outer surface of the headlight of vehicles, as shown in FIG. 1 and FIG. 2.

As shown in FIG. 3, the abovementioned laminated plate 3B preferably has a thickness equal to the distance at which the parallel beam passes through 25 sheets stacked obliquely of the optical axis thereof, accompanied by intermediate phases therebetween when 25 glass sheets are, as the aforementioned, employed to form the laminated plate 3B so as to repeat the light reflection thereon respectively.

Therefore, if the thickness of one glass sheet is 0.5 mm and the abovementioned angle $\theta_2$ is 33°, the thickness of the laminated plate 3B becomes $0.5 \times 25/\cos 33 = 14.9$ mm, where the thickness of the air phase interplaced between the glass sheets may be ignored.

Figure 5:
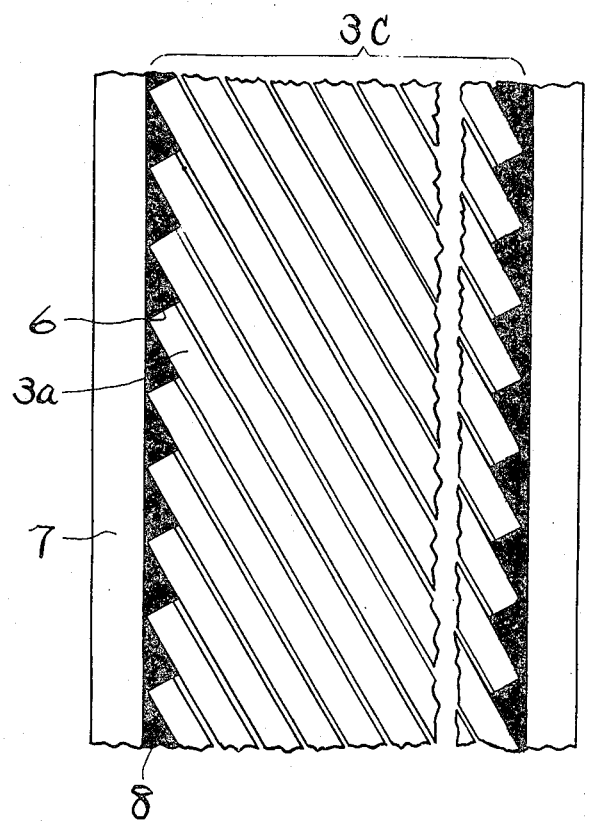
FIG. 5 is a partially enlarged cross section of a further embodiment of a similar laminated transparent plate.
Figure 6:
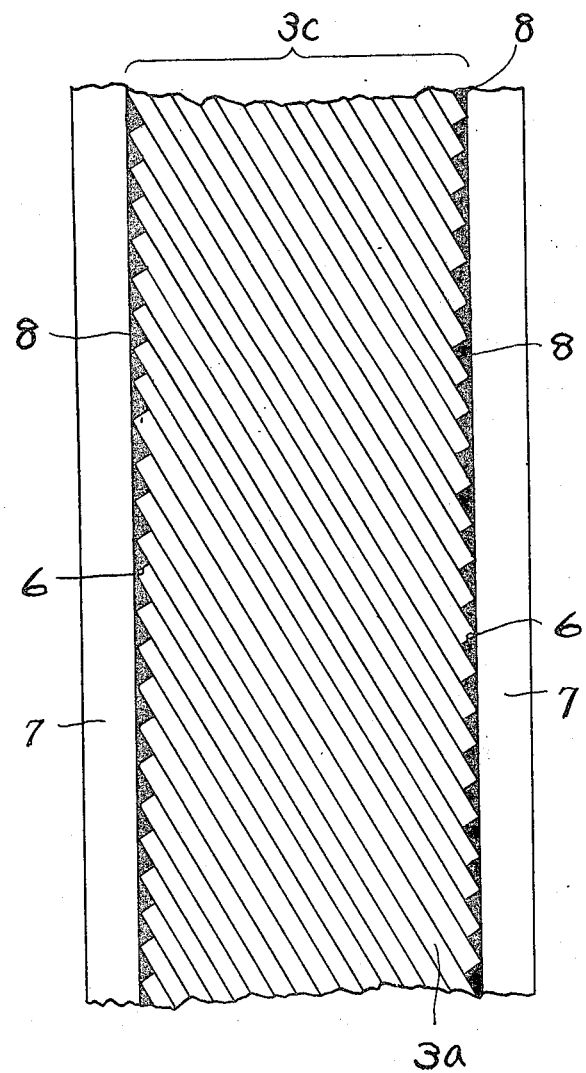
FIG. 6 is a cross section of the laminated plate shown in FIG. 5.

FIG. 5 shows another embodiment. Here the transparent sheets 3a are obliquely arranged in a manner similar to that in FIG. 3. However, in FIG. 3, the end surface 6 at both ends of the glass sheets is left at right angle with respect to the elongate direction thereof similarly to ordinary glass sheets. A separate glass sheet 7 is fitted at both sides of the laminated plate 3C to adhere fast to the aligned end surfaces 6 of the transparent sheets by means of an adhesive filled within a space 8 therebetween, the adhesive such as synthetic resign having the same refractive index as glass, whereby the laminated plate 3C has the same function as the laminated plate 3B in FIG. 3.

It is not necessary for the transparent sheets forming the laminated plates 3A, 3B and 3C in FIG. 1 through FIG. 4 to be glass only, and it is sufficient that the thickness thereof is be about 0.1 mm.

Furthermore, the phase between transparent sheets is not limited to air but may be transparent oil impregnated thereinto or synthetic resin solidified after injection thereinto.

The opposite relation between these two phases can be considered by selecting glass as the transparent sheets and using liquid or a solid having larger refractive index than glass as the material filled between the glass sheets. That is, if an angle of polarization is obtained when light is projected from the glass phase to a phase with a larger refractive index, exactly, there exists the same principle applies as when the refractive index of the phase between the glass sheets is smaller than that of glass of the sheets.

Light utilized for forward illumination of vehicles may be either the component ($Pp$) of the transmitted light or the component ($Ps$) of reflected light. If the component ($Pp$) is to be projected, for example, it will be possible to shield the light component ($Pp$) from the driver by his wearing eye-glasses with the direction of the polarizing plate so as to shield the component ($Pp$) and only to pass the component ($Ps$) therethrough, or by attaching the same plate to the windshield of the vehicle so as to shield the light component ($Pp$) and to prevent glare from the headlight.

Light other than a direct light from the headlight, such as light from the environs, which enters the driver's eyes is an indirect light. Thus even if it is projection of polarized through the polarizing plate at the driver's side because it has the polarized light disappeared and contains the component ($Ps$).

There is no loss of the amount of light in the illumination system of the device of the invention. However the amount of light observed through the polarizing plate in front of the driver will be approximately one half.

However, the effect of shielding the direct light from the headlight is large and from the point of view of the original object of differentiating the environs, the advantage of shielding the direct light from the headlight more than makes up the disadvantage of reducing the amount of light observed. It is expected that traffic accidents caused by dazzling of the driver, will be prevented.

Furthermore, it becomes unnecessary to provide the partitions in the central isolation zones or green belts of roads so as to shield the direct light from the headlight of vehicles so that the economic effect is also increased.

What we claim is:

1. A polarizing device for polarizing light from a light source in the headlight of vehicles, comprising
   a. a paraboloidal reflector behind the light source for forming a parallel beam with light from the light source;
   b. a transparent laminated plate disposed in the path of the beam of parallel light, said plate comprising a plurality of transparent sheets having a material between the sheets, said material having a refractive index different from the refractive index of said sheets, each of said sheets being angularly disposed relative to the optical axis of the parallel light from the beam at an angle equal to the polarization angle so that the parallel light is refracted at the interface of the transparent sheets and the material and projected to the next transparent sheet at the polarization angle, said sheets each having surfaces at their edges, said surfaces being angular relative to the planes of the sheets, said surfaces forming a light penetration plane extending along a substantial majority of one side of said plate and an emergence plane extending along a substantial majority of the other side of said plate for the parallel light projected on said plate, said planes being substantially perpendicular to the optical axis of the parallel light.

2. A polarized illumination device according to claim 1, wherein said laminated plate has at each outer side thereof an outwardly supporting transparent plate which is joined to aligned end portions of said transparent sheets uniformly forming said laminated plate, said supporting transparent plate having an angle of $\pi/2$ minus the polarization angle with respect to said transparent sheets, said outwardly supporting transparent plate being illuminated perpendicularly thereto by the parallel beam from the light source.

3. A polarized light illumination device according to claim 1; wherein said uniform transparent sheets each has an end surface thereof formed at right angles to the elongate direction thereof, a transparent plate joined to the aligned end portions of said transparent sheets at both outer sides of said laminated plate in the relation that said transparent plate has respectively an angle of π/2 minus the polarization angle with respect to said transparent sheets, and a material filled into the space between said transparent plate and the aligned end portions of said transparent sheets, said material having a refractive index equal to said uniform transparent sheets.

4. A device as in claim 1, wherein the material is air.

5. A device as in claim 1, wherein said sheets are composed of an isotropic material.

* * * * *